United States Patent
Aoki

(10) Patent No.: US 9,174,270 B2
(45) Date of Patent: Nov. 3, 2015

(54) CASTING MOLD SET

(75) Inventor: Norimitsu Aoki, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/110,843

(22) PCT Filed: Apr. 13, 2012

(86) PCT No.: PCT/IB2012/000848
§ 371 (c)(1),
(2), (4) Date: Oct. 9, 2013

(87) PCT Pub. No.: WO2012/140511
PCT Pub. Date: Oct. 18, 2012

(65) Prior Publication Data
US 2014/0033913 A1 Feb. 6, 2014

(30) Foreign Application Priority Data
Apr. 13, 2011 (JP) ................. 2011-088859

(51) Int. Cl.
*B22C 9/02* (2006.01)
*B22C 9/06* (2006.01)
*B22C 9/10* (2006.01)
*B22C 9/24* (2006.01)
*F16J 13/00* (2006.01)

(52) U.S. Cl.
CPC ... *B22C 9/02* (2013.01); *B22C 9/06* (2013.01); *B22C 9/064* (2013.01); *B22C 9/10* (2013.01); *B22C 9/24* (2013.01); *F16J 13/00* (2013.01)

(58) Field of Classification Search
CPC ............ B22C 9/02; B22C 9/06; B22C 9/064; B22C 9/10; B22C 9/24
USPC ................... 164/271, 339, 340, 365, 369, 137
See application file for complete search history.

(56) References Cited

U.S. PATENT DOCUMENTS

| | | | | |
|---|---|---|---|---|
| 4,266,595 A | * | 5/1981 | Perkey et al. ................ | 164/520 |
| 5,113,926 A | * | 5/1992 | Kanzawa et al. ............ | 164/119 |
| 5,234,046 A | * | 8/1993 | Kuhn et al. .................. | 164/127 |
| 5,263,533 A | * | 11/1993 | Druschitz et al. ............ | 164/363 |
| 8,118,079 B2 | * | 2/2012 | Hanna et al. ................. | 164/98 |

FOREIGN PATENT DOCUMENTS

| | | |
|---|---|---|
| JP | 05-253663 A | 10/1993 |
| JP | 06-269899 A | 9/1994 |
| JP | 07-060400 A | 3/1995 |
| JP | 08-276243 A | 10/1996 |
| JP | 2001-030046 A | 2/2001 |
| JP | 2004-230403 A | 8/2004 |

OTHER PUBLICATIONS

International Search Report for corresponding International Patent Application No. PCT/IB2012/000848 mailed Sep. 3, 2012.

* cited by examiner

*Primary Examiner* — Kevin P Kerns
(74) *Attorney, Agent, or Firm* — Sughrue Mion, PLLC

(57) ABSTRACT

The mold set is constructed with a cope, a drag, cheeks, and a core. In a case where the mold set is closed before molten metal is fed, a first clearance between a first mold (cope) that is located above a casting shape forming part of the core and the casting shape forming part is smaller than a second clearance between an upper surface of a core print of the core and a second mold (cheek) that is opposed to the upper surface.

3 Claims, 5 Drawing Sheets

CASTING MOLD SET

BACKGROUND OF THE INVENTION

1. Field of the Invention

The present invention relates to a casting mold set that includes a core.

2. Description of Related Art

When a casting in a complex shape, particularly a casting that has a space inside (a die casting) is cast, in addition to a mold that defines an outer shape of the casting (appearance profile), a mold that defines the space inside of the casting is used. The mold that defines the outer shape of the casting typically includes a drag, a cope, and a cheek. Some mold sets define the shape of a cavity with only the drag and the cope, and some mold sets define the cavity with the cope, the drag, and plural cheeks. Herein, assembling the mold set to define an enclosed space of the cavity is referred to as "closing a mold." The mold "set" herein means a group of molds that are necessary to define the cavity and includes a "core" that is described later. In addition, the term "casting" that is described herein is a general term of a product that is cast with a mold and includes castings that are made of not only cast iron but also other metals such as aluminum (aluminum die castings).

The mold that defines the interior space of the casting is called a core. In this specification, a part of the core (end) is referred to as a core print, and a part other than core prints is referred to as a casting shape forming part. The "core print" is a term that is used in casting engineers. The core print is a core end that does not contribute to the shape forming of the castings, and its upper and lower parts are held by the other parts. The core print is most commonly held by the cope and the drag, or the drag and the cheek. The "casting shape forming part" is a part of the core except for the core prints, namely, a part that contributes to the shape forming of the castings. In other words, a surface of the casting shape forming part corresponds to a cavity surface.

In the casting production such as aluminum die casting, the core is fabricated by baking a mixture of sand and resin. The resin serves as a binder to compact the sand. Such the mixture of the sand and the resin is also called resin coated sand.

The strength of the core that is made of the sand is not so high. Therefore, when the mold set is closed, if the core is strongly caught in the other mold, the shape of the core may be affected. Thus, a gap with a predetermined clearance is usually provided between the core and the other mold in a state where the mold set is closed.

The core that is made of the sand is lighter than molten metal in weight, and thus when the molten metal is poured into the cavity, the core floats by the gap with the clearance. A technique that prevents the core from floating is disclosed in Japanese Patent Application Publication No. 5-253663 (JP 5-253663 A), for example. The technique disclosed in JP 5-253663 A includes a slide rod that presses the core print against the drag from above after the mold set is closed.

However, if the core is pressed from above, a gap remains above the core. If the gap remains between the casting shape forming part and a mold that is located above the casting shape forming part of the core, the molten metal flows into the gap, and a so-called "burr" may be produced.

SUMMARY OF THE INVENTION

The object of the present invention is to provide a casting mold set that prevents burr from producing.

As described above, the technique disclosed in JP 5-253663 A is to prevent the floating of the core. The technique that is disclosed in this specification positively uses buoyancy of the core thinking from a different angle. By floating the core, a gap above the casting shape forming part is filled. More specifically, when the core floats, a gap in an upper surface of the core print is widened so that an upper surface of the casting shape forming part comes into contact with the other mold. By designing such the mold set, the upper surface of the casting shape forming part is ensured to come into contact with the other mold.

A first aspect of the present invention is directed to a casting mold set that includes a core. The mold set is determined such that in a case where the mold set is closed before molten metal is fed, a first clearance between a first mold that is located above a casting shape forming part of the core and the casting shape forming part is smaller than a second clearance between an upper surface of a core print of the core and a second mold that is opposed to the upper surface. The term "clearance" means a space of the gap between two adjacent molds (including the core). In this specification, particularly, the clearance means a space in a vertical direction.

The mold set may include a cope, a drag, and a cheek, and a cavity may be defined with those molds. The "first mold" may be the cope, and the "second mold" may be the cheek. However, some mold sets are used by stacking plural cores, and therefore the "first mold" may be the core in an upper stage of the cores that are vertically stacked. That is to say, the technique in which this specification discloses preferably prevents burr from being produced between the cores in a case where plural cores are vertically stacked.

Because the clearance (first clearance) that is formed above the casting shape forming part is smaller than the clearance (second clearance) that is formed above the core print, when the molten metal flows into the cavity and the core floats, the upper surface of the casting shape forming part comes into contact with the mold above it, and the gap disappears. Therefore, the burr is hardly produced above the casting shape forming part.

In the casting mold set described above, a gas discharging port may be formed in the first mold, in which one side of the gas discharging port is opened to face the core and the other side of the gas discharging port is opened to an outside of the first mold. In a case where the mold set is closed before molten metal is fed, the first clearance may be formed between an area of the first mold surrounding an opening of the gas discharging port that faces the core, and the core facing the area of the first mold. The gas discharging port is provided in order to discharge the gas that is produced from the core by the heat of the molten metal to the outside. When an area around the gas discharging port is surrounded by the first clearance, the area around the gas discharging port is blocked during the floating of the core. Therefore, the molten metal is prevented from flowing into the gas discharging port.

A second aspect of the present invention is directed to a casting mold set. In a case where the mold is closed before molten metal is fed, a minimum clearance of a gap between a first mold that is located above a casting shape forming part of the core and the casting shape forming part is smaller than a minimum clearance of a gap between an upper surface of a core print of the core and a second mold that is opposed to the upper surface. Here, the minimum clearance corresponds to a clearance of the gap that faces the cavity.

The casting that is produced with the mold set described above has fewer burrs in the casting. With such the casting, a burr removal process after the casting can be simplified. Therefore, such the castings can be produced at lower cost than the castings that are produced with the mold according to the related art. An aspect of the technique in which this specification discloses can provide more inexpensive castings than those from the related art.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 4A through 4C are a plan view and cross-sectional views of the cylinder head, in which FIG. 4A is a plan view of the cylinder head, FIG. 4B is a cross-sectional view that is taken along a line B-B of FIG. 4A, and FIG. 4C is a cross-sectional view that is taken along a line C-C of FIG. 4A;

DETAILED DESCRIPTION OF EMBODIMENTS

First Embodiment

Figure 1:
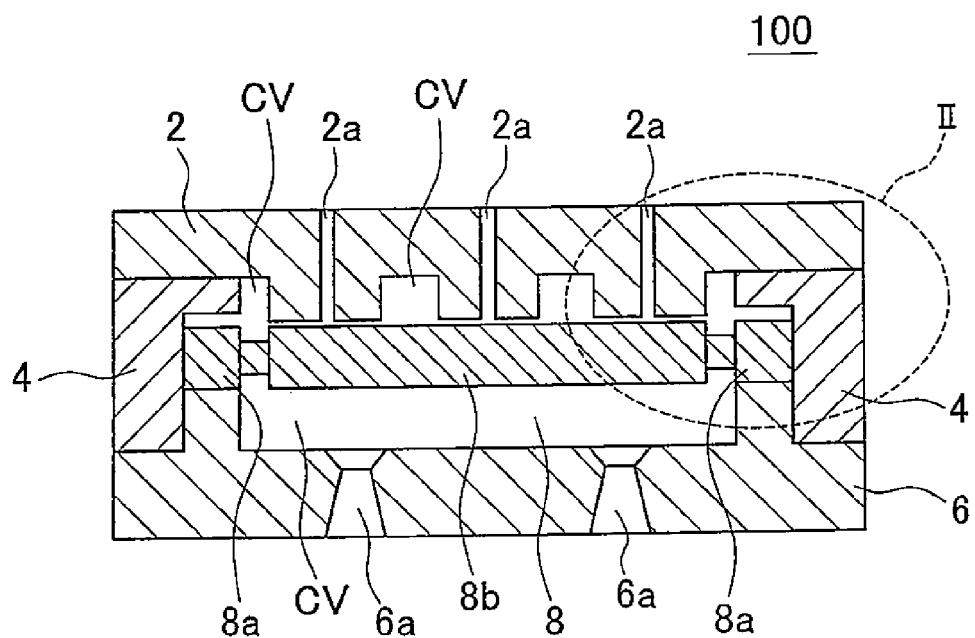
FIG. 1 is a cross-sectional view of a mold set according to a first embodiment of the present invention.
Figure 2:
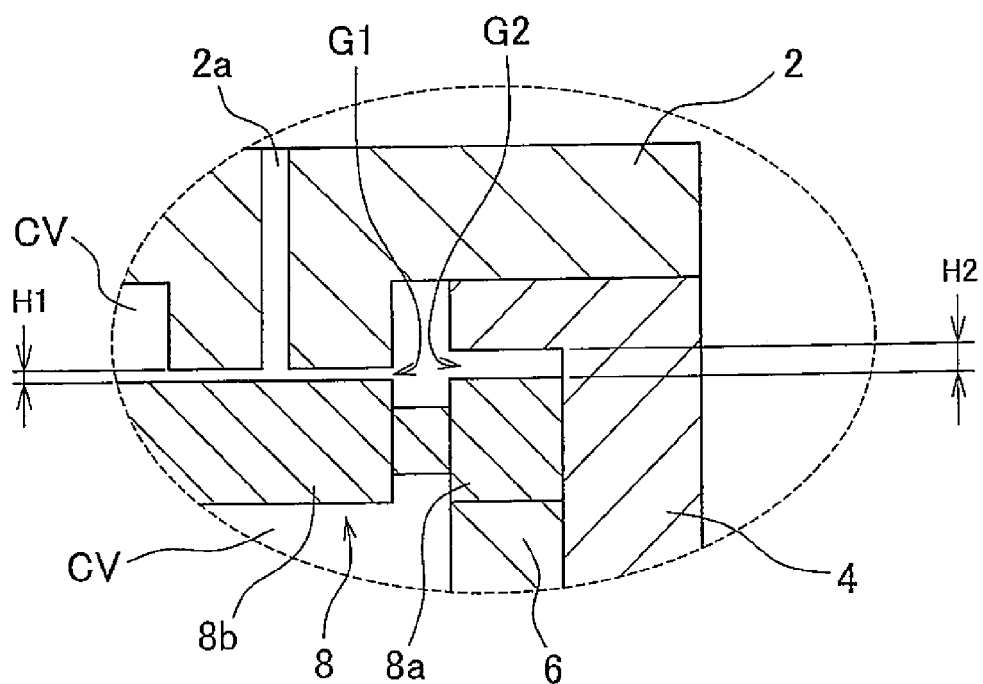
FIG. 2 is an enlarged view of a region that is enclosed by a dashed line II of FIG. 1.

With reference to FIG. 1 and FIG. 2, a mold set 100 according to a first embodiment is described. The mold set 100 is a group of molds that cast a cylinder head of an engine. A shape of the cylinder head as a casting object will be exemplarily described in a second embodiment. The technique that is disclosed in this specification aims at a relation between the core and the molds (such as the cope, the drag, and the cheek) that define the shape of the cavity, and therefore the shape of the casting object is not described in the first embodiment.

FIG. 1 is a cross-sectional view of the mold set 100, and FIG. 2 is an enlarged view of a region that is enclosed by a dashed line II of FIG. 1. The mold set 100 is constructed with a cope 2, a drag 6, a pair of cheeks 4, and a core 8. When the cope 2, the drag 6, and the pair of cheeks 4 are brought into contact with each other, the shape of the cavity CV is defined. The shape of the cavity CV corresponds to the shape of an appearance of a desired casting. The core 8 is used for producing a space in the interior of the cylinder head (such as a space for a cam case). Although the core 8 also defines a part of the cavity CV, the core 8 forms a cavity surface that defines the space which is formed in the interior of the casting, instead of the outer shape of the desired casting (the shape of the cavity).

The core 8 is divided into a core print 8a and a casting shape forming part 8b. The core print 8a is a part that is held by the drag 6 and the cheeks 4 at an upper and a lower side and that does not contribute to the shape forming of the desired casting. On the other hand, the casting shape forming part 8b is a part that forms an interior space of the cylinder head as described above. A surface of the casting shape forming part 8b corresponds to a cavity surface.

The core print 8a and the casting shape forming part 8b of the core 8 are made of the same material. The core 8 is made by packing the mixture of sand and resin in a mold and baking the mixture. During the casting, the resin is evaporated by the heat of the molten metal. In other words, the core 8 produces gases during the casting. The gases are discharged to the outside through a gas discharging port 2a that is described later.

The drag 6 is provided with plural molten metal feed openings 6a. The molten metal is poured from the outside into the cavity CV through the molten metal feed openings 6a. The cope 2 is provided with gas discharging ports 2a. One opening of the gas discharging port 2a opens into the casting shape forming part 8b of the core 8, and the other opening leads to the outside of the mold. As described above, the gas that is produced from the core 8 during the casting (resin evaporating gas) is discharged to the outside through the gas discharging ports 2a.

Both of FIG. 1 and FIG. 2 show a state in which the mold set is closed and placements of respective molds before the feeding of the molten metal. As shown in FIG. 2, a gap G1 is formed between an upper surface of the casting shape forming part 8b of the core 8 and the cope 2, and a gap G2 is also formed between an upper surface of the core print 8a of the core 8 and the cheek 4. In the mold set 100, a height H1 of the gap G1 in a height direction (a first clearance) is determined to be smaller than a height H2 of the gap G2 in the height direction (a second clearance). The first clearance H1 corresponds to a space in the narrowest part of the gap between the upper surface of the casting shape forming part 8b and the cope 2, and the second clearance H2 corresponds to a space in the narrowest part of the gap between the upper surface of the core print 8a and the cheek 4. Furthermore, the first clearance H1 is evenly spaced in a boundary between the core that is formed to face the cavity CV and the other mold.

After the mold set 100 is closed, the molten metal is fed into the cavity CV through the molten metal feed opening 6a. A specific gravity of the core 8 is lower than that of the molten metal. Therefore, when the molten metal is poured into the mold, the core 8 moves upward by its buoyancy. At that time, because the gap G1 is narrower than the gap G2, the upper surface of the casting shape forming part 8b of the core 8 is always brought into contact with the cope 2, and the upper surface of the core print 8a does not come into contact with the cheek 4. In other words, when the molten metal is poured into the mold, the gap G1 between the upper surface of the casting shape forming part 8b and the cope 2 completely disappears, and a space in which the molten metal flows also disappears. Furthermore, that is to say, the gap disappears in the boundary that faces the casting shape forming part 8b and the cavity CV of the cope 2. Therefore, the burr is prevented from being produced between the casting shape forming part 8b and the cope 2. In other words, the burr is prevented from being produced between the core and the other mold. The gap G2 between the upper surface of the core print 8a and the cheek 4 narrows through the floating of the core 8 but does not disappear. Thus, the burr is produced in the gap G2. However, because the core print 8a is located on the outer periphery of the desired casting, the burr can be removed easily in a downstream process. Furthermore, the lower surface of the casting shape forming part 8b does not come into contact with any molds, and therefore no burr can be produced.

As shown in FIG. 2, an opening of the gas discharging port 2a faces the casting shape forming part 8b, and the gap is formed between an area of the cope which surrounds the opening of the gas discharging port 2a and the casting shape forming port 8b which faces the area of the cope, and is evenly spaced with the clearance H1. That is to say, a gap with the first clearance is formed to surround the opening of gas discharging port that faces the casting shape forming part 8b.

Therefore, when the core 8 is floated by the molten metal, the cope 2 and the casting shape forming part 8b come into close contact with each other around the opening of the gas discharging port 2a. Thus, the molten metal is prevented from entering the gas discharging port 2a.

The gap G1 (clearance H1) corresponds to the narrowest part of the space between the upper surface of the casting shape forming part 8b and the cope 2. The gap G2 (clearance H2) Corresponds to the narrowest part of the space between the core print 8a and the cheek 4. Therefore, the features of the mold set 100 can be described as follows. That is, a minimum clearance H1 of the space between the casting shape forming part 8b and a first mold (the cope 2) that is located above the casting shape forming part 8b of the core 8 is smaller than a minimum clearance H2 between the upper surface of the core print 8a of the core 8 and a second mold (the cheek 4) that is opposite to the upper surface of the core print 8a of the core 8.

Second Embodiment

Figure 3:
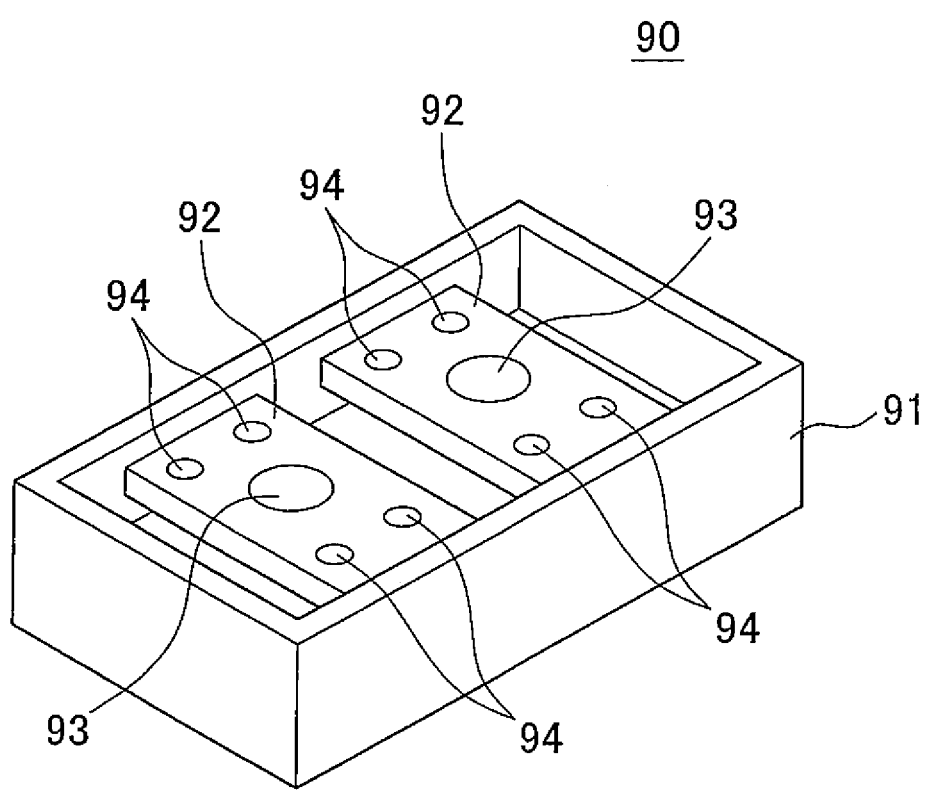
FIG. 3 is a schematic perspective view of a cylinder head.

With reference to FIGS. 3 through 7, a mold set 200 according to a second embodiment is described. FIG. 3 is a schematic perspective view of a cylinder head 90 that is produced with the mold set 200. It is noted that the shape of the cylinder head 90 or the shape of the mold set 200 which is shown in the drawings is schematic and the details of actual shapes of the cylinder head and the like are not accurately illustrated herein. FIGS. 4A through 4C are a plan view and cross-sectional views of the cylinder head 90. FIG. 4A is a plan view, and FIG. 4B is a cross-sectional view that is taken along a line B-B of FIG. 4A. FIG. 4C is a cross-sectional view that is taken along a line C-C of FIG. 4A. The cylinder head 90 has a shape in which a head section 92 is formed inside of the box-like frame 91. A reference numeral 93 denotes a spark plug hole, and 94 denotes a valve lifter bore hole. As shown in FIGS. 4B and 4C, the spark plug hole 93 and the valve lifter bore hole 94 do not pass through the cylinder head 90; however, these holes are worked into through-holes in the downstream process after the casting.

The space for the cam case (cam case space 96) is formed between a bottom section of the frame 91 and the head section 92. In order to form the cam case space 96, a core 18 that is described below is used.

Figure 5:
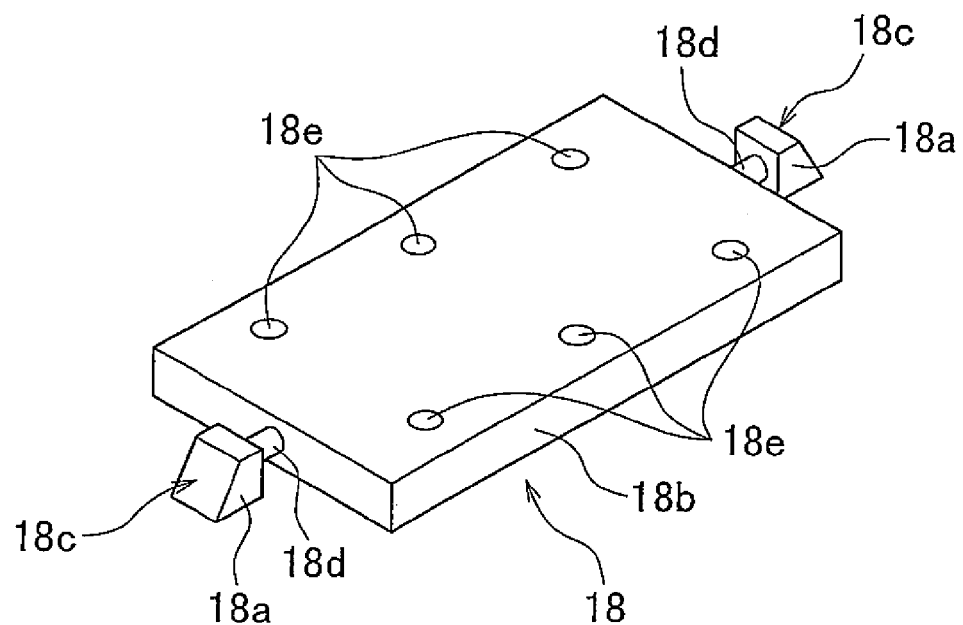
FIG. 5 is a schematic perspective view of a core according to a second embodiment of the present invention.
Figure 6:
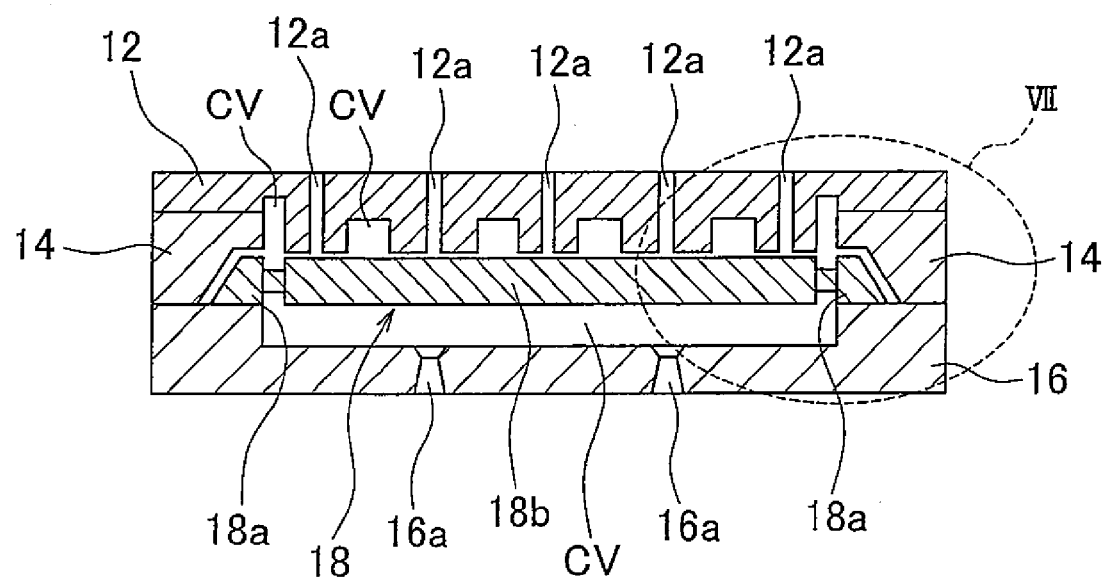
FIG. 6 is a cross-sectional view of a mold set according to a second embodiment of the present invention.
Figure 7:
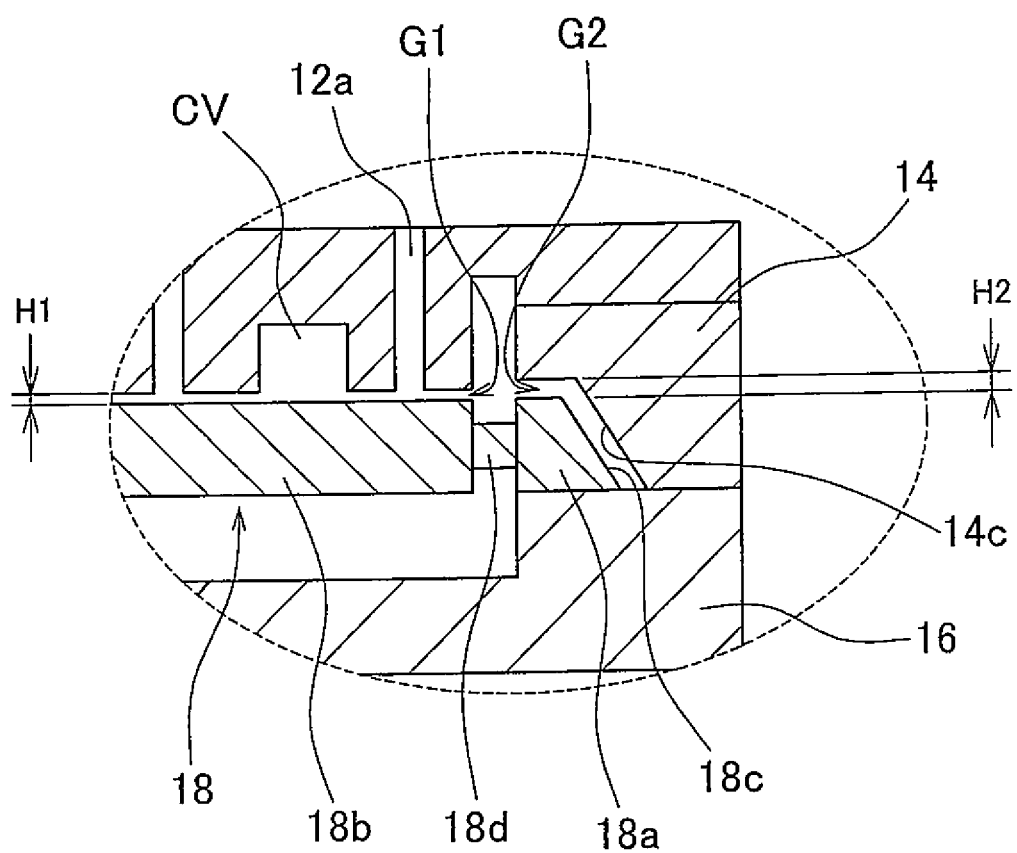
FIG. 7 is an enlarged view of a region that is enclosed by a dashed line VII of FIG. 6.

FIG. 5 is a perspective view of the core 18 that forms the cam case space 96. FIG. 6 is a cross-sectional view of the mold set 200 that casts the cylinder head. FIG. 7 is an enlarged view of a region that is enclosed by a dashed line VII of FIG. 6. Here, FIG. 6 corresponds to the cross-section that is taken along the line C-C of FIG. 4A.

Figure 4A:
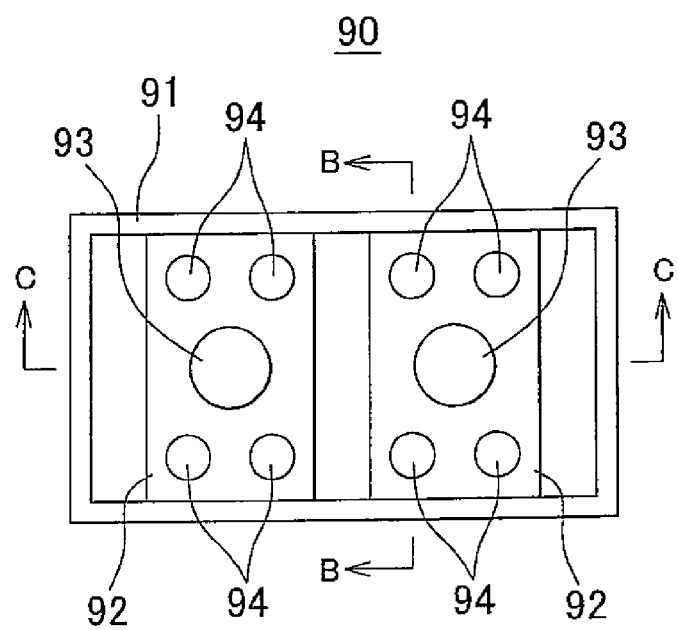
Figure 4B:
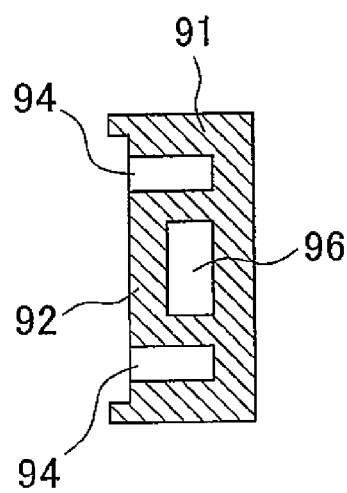
Figure 4C:
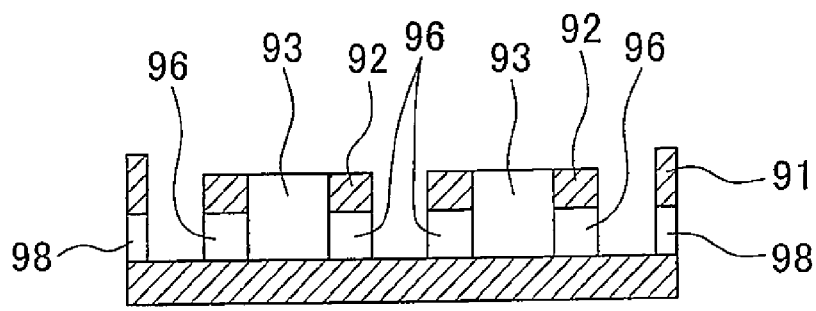

The core 18 includes a casting shape forming part 18b that defines the cam case space 96, a core print 18a for holding the core 18 with the other mold, and a connecting section 18d that connects between the core print 18a and the casting shape forming part 18b. A hole through which the connecting section 18d passes is formed in the frame 91 of the cylinder head immediately after the casting; however, the hole is not an essential part as a function of the cylinder head 90 but a necessary part to hold the core 18 only, and therefore the hole is plugged after the casting. A part that is shown with a reference numeral 98 in FIG. 4C is a hole that is formed by the connecting section 18d. A reference numeral 18e denotes spaces (through-holes) that form a column section which connects between a bottom section of the frame 91 and the head section 92. The molten metal flows into the through-holes to form the column section and therefore the frame 91 and the head section 92 are formed as the casting in one body.

Each side surface of the core prints 18a on both ends of the core 18 (an inclined side surface 18c) is inclined to a vertical direction. The inclined side surfaces 18c are described later in detail.

As shown in FIG. 6, the mold set 200 is constructed with a drag 16, a cope 12, a pair of cheeks 14, and the core 18. As is the case in the first embodiment, the cope 12, the drag 16, and the cheeks 14 define the shape of the cavity CV (the shape of an appearance of the cylinder head 90 as the desired casting). The cope 12 is provided with plural gas discharging ports 12a, and the drag 16 is provided with plural molten metal feed openings 16a.

As shown in FIG. 7, also in the mold set 200, a gap G1 is formed between an upper surface of the casting shape forming part 18b of the core 18 and the cope 12, and a gap G2 is formed between an upper surface of the core print 18a of the core 18 and the cheek 14. Each mold that includes the core 18 is formed such that a height H1 of the gap G1 in a height direction (a first clearance) is smaller than a height H2 of the gap G2 in the height direction (a second clearance). The first clearance H1 corresponds to a space in the narrowest part of the gap between the upper surface of the casting shape forming part 18b and the cope 12, and the second clearance H2 corresponds to a space in the narrowest part of the gap between the upper surface of the core print 18a and the cheek 14. In a part that surrounds the opening of the gas discharging port 12a which faces the core, the height of the gap G1 is evenly spaced with the first clearance H1. The mold set 200 of the second embodiment achieves the same effect as the mold set 100 of the first embodiment. As is the case in the first embodiment, the lower section of the casting shape forming part 18b does not come into contact with any other molds.

The mold set 200 has features in the inclined side surface 18c of the core print 18a of the core 18 and an opposing surface 14c of the cheek 14 that faces the inclined side surface 18c. The inclined side surface 18c of the core print 18a is inclined upward from the lower section so as to come close to the center of the core 18. In other words, the lower section of the inclined side surface 18c protrudes outward of the core print 18a and is inclined upward toward the center of the core 18. In addition, a surface that is opposed to the inclined side surface 18c of the core print 18a in the cheek 14 (opposing surface 14c) is inclined in parallel with the inclined side surface 18c of the core print 18a. Although not shown in the drawing, the core print and the cheek at the opposite side also have the similar inclined surface. When the molten metal is poured into the cavity CV and the core 18 starts floating, the inclined side surface 18c comes into contact with the opposing surface 14c. When the core 18 further floats, a position of the core in a horizontal direction of FIG. 6 can be guided with the opposing surface 14c of the cheek 14 and positioned accurately in a specified position. In addition to the advantages of the mold set 100, the mold set 200 has a further advantage, in which the core 18 can be accurately positioned when the molten metal is poured in the mold set 200.

The cylinder head 90 that is produced with the mold set 200 has fewer burrs in the casting. That is to say, a burr removal process after the casting can be simplified. Therefore, the castings can be produced at lower cost than the castings that are produced with the mold according to the related arts. The point in which the castings can be produced at lower cost is also an advantage of the mold set according to the embodiments of the present invention.

While the present invention has been described in detail with reference to example embodiments thereof, it is to be understood that those examples are merely illustrative and claims of the present invention are not limited to those examples. Techniques that are disclosed in the claims of the present invention are intended to cover various modifications and changes of the example embodiments that are described above. In addition, the technical elements that are disclosed in the specification and the drawings exhibit technical usefulness alone or in various combinations and configurations, and those are not limited to the combinations and configurations that are disclosed in the claims at the time of filing this application. The techniques that are illustrated in the specification and the drawings can achieve a plurality of objects simultaneously, and the achievement of one object thereof itself has technical usefulness.

The invention claimed is:

1. A casting mold set comprising:
    a core that includes a casting shape forming part for forming a shape of a casting that is formed by the casting mold set and a core print that does not contribute to form the shape of the casting;
    a first mold that is located above the casting shape forming part of the core; and
    a second mold that is opposed to an upper surface of the core print of the core;
    wherein;
    in a case where the mold set is closed before molten metal is fed, a minimum clearance between the casting shape forming part and the first mold is smaller than a minimum clearance between the upper surface of the core print and the second mold that is opposed to the upper surface of the core print, so that the upper surface of the core print does not contact the second mold that is opposed to the upper surface of the core print, wherein the casting shape forming part is configured to float upward when molten metal is fed into the closed mold set so that the minimum clearance between the casting shape forming part and the first mold disappears.

2. The casting mold set according to claim 1, wherein a cope, a drag, and a cheek define a cavity, the first mold being the cope, and the second mold being the cheek.

3. The casting mold set according to claim 1, wherein a gas discharging port is formed in the first mold, in which one side of the gas discharging port is opened to face the core and the other side of the gas discharging port is opened to an outside of the first mold,
    in a case where the mold set is closed before molten metal is fed, the first clearance is provided between an area of the first mold surrounding an opening of the gas discharging port that faces the core, and the core facing the area of the first mold.

* * * * *